UNITED STATES PATENT OFFICE.

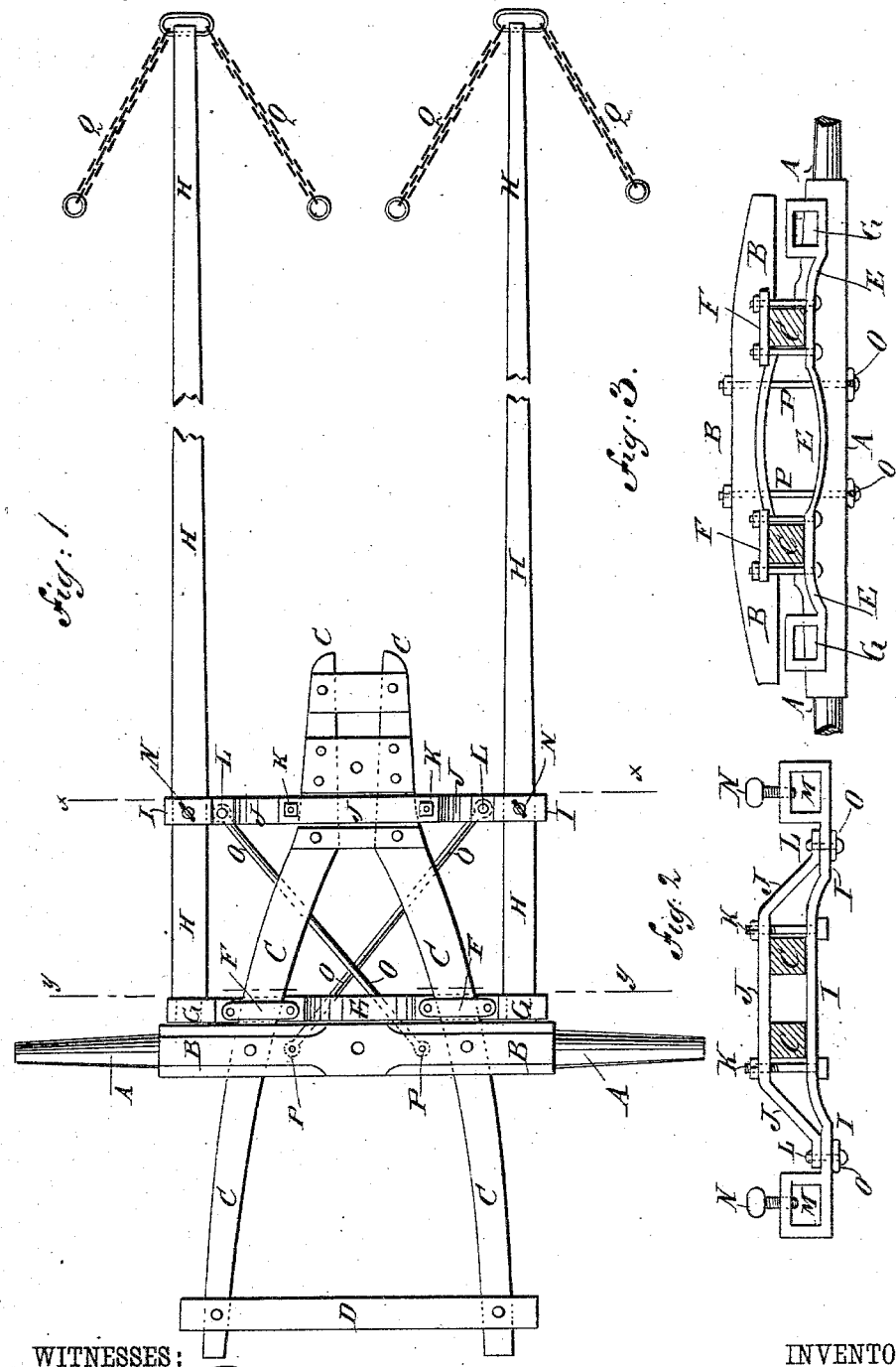

ALFRED TAYLOR HAWK AND JOSEPH WINFIELD SCOTT, OF PRESTON, OHIO.

POLE ATTACHMENT FOR WAGONS.

SPECIFICATION forming part of Letters Patent No. 305,815, dated September 30, 1884.

Application filed June 27, 1884. (No model.)

*To all whom it may concern:*

Be it known that we, ALFRED TAYLOR HAWK and JOSEPH WINFIELD SCOTT, of Preston, in the county of Hamilton and State of Ohio, have invented a new and useful Improvement in Two-Pole Attachments for Wagons, of which the following is a full, clear, and exact description.

Reference is to be had to the accompanying drawings, forming a part of this specification, in which similar letters of reference indicate corresponding parts in all the figures.

Figure 1 is a plan view of our improvement shown as applied to the forward hounds of a wagon. Fig. 2 is a sectional front elevation of the same, taken through the line $x\,x$, Fig. 1. Fig. 3 is a sectional front elevation of the same, taken through the line $y\,y$, Fig. 1.

The object of this invention is to facilitate the attachment of three horses to a two-horse wagon.

The invention consists in a two-pole attachment for wagons, constructed with a socket-bar secured to the hounds at the forward side of the axle by clips, and a socket-bar secured to the forward part of the hounds by a keeper, and strengthened in place by brace-rods attached to it and to the said axle, whereby two poles can be readily applied to the wagon, as will be hereinafter fully described.

A represents the axle, B the sand-board, C the hounds, and D the sway-bar, of an ordinary two-horse wagon.

To the under side of the hounds C, close to the forward axle, A, is secured a bar, E, by clips F, passing around the said hounds.

In the ends of the bar E are formed loops or sockets G to receive the ends of the poles H.

To the under side of the forward part of the hounds C is secured a bar, I, by a keeper, J, passing over the said hounds, and connected with the said bar I, at the outer sides of the hounds C, by bolts K, and at the ends of the said keeper J by bolts L.

In the ends of the bar I are formed loops or sockets M to receive the poles H. The loops M can be provided with set-screws N, for securing the poles H in place; but the set-screws N are not essential, as the rear ends of the poles H rest against the forward side of the axle A, and there is no draft upon the said poles, the draft being applied to the forward part of the hounds C in the same place and manner as when two horses are used.

To adjust the wagon for two horses the poles H are withdrawn from the sockets G M, the three-horse double-tree is detached, and the ordinary pole and two-horse double-tree are attached in the usual manner. The forward socket-bar, I, is further secured in place by brace-rods O, the forward ends of which are secured to the said socket-bar I by the bolts L, that secure the ends of the keeper J. The rear ends of the brace-rods O are secured to the axle A by the bolts P, that secure the sand-board B to the said axle.

To the forward end of each pole H are attached the ends of two chains or straps, Q, one of which is designed to be attached to the breast-strap of a side horse and the other to the breast-strap of the center horse.

Having thus described our invention, we claim as new and desire to secure by Letters Patent—

1. A two-pole attachment for wagons, constructed substantially as herein shown and described, and consisting of the bar E, having sockets G and clips F, the bar I, having sockets M and a keeper, J, and the brace-rods O, to adapt the attachment to be applied to the hounds and axle of a wagon, as set forth.

2. The combination, with the axle A and hounds C of a wagon, of the socket-bar E and its clips F, the socket-bar I and its keeper J, and the brace-rods O, substantially as herein shown and described, whereby two poles can be readily applied to the said wagon, as set forth.

ALFRED TAYLOR HAWK.
JOSEPH WINFIELD SCOTT.

Witnesses:
ELIZA A. SATER,
W. E. GWALTNEY.